United States Patent [19]

Kitajima et al.

[11] Patent Number: 4,544,148
[45] Date of Patent: Oct. 1, 1985

[54] AUTOMATIC ORIGINAL CONVEYING DEVICE

[75] Inventors: Tadayuki Kitajima; Kimiaki Hayakawa; Noriyoshi Ueda, all of Yokohama; Masakazu Hiroi, Tokyo, all of Japan

[73] Assignee: Canon Kabushiki Kaisha, Tokyo, Japan

[21] Appl. No.: 466,874

[22] Filed: Feb. 16, 1983

[30] Foreign Application Priority Data

Feb. 24, 1982 [JP] Japan .................. 57-28380
Feb. 24, 1982 [JP] Japan .................. 57-28381
Mar. 25, 1982 [JP] Japan .................. 57-47810

[51] Int. Cl.⁴ .................................. B65H 5/22
[52] U.S. Cl. .................................. 271/3.1; 271/186; 271/291; 271/301; 271/902
[58] Field of Search ............... 271/291, 301, 3.1, 186, 271/DIG. 9, 902

[56] References Cited

U.S. PATENT DOCUMENTS

| | | | |
|---|---|---|---|
| 3,556,512 | 1/1971 | Fackler | 271/4 |
| 4,169,674 | 10/1979 | Russel | 355/14 |
| 4,192,607 | 3/1980 | Hage | 271/301 X |
| 4,234,180 | 11/1980 | Looney | 271/3.1 |
| 4,238,126 | 12/1980 | Langdon | 271/3.1 |
| 4,411,517 | 10/1983 | Gerken | 271/3.1 |
| 4,433,836 | 2/1984 | Kulpa | 271/301 X |

Primary Examiner—Richard A. Schacher
Attorney, Agent, or Firm—Fitzpatrick, Cella, Harper & Scinto

[57] ABSTRACT

This specification discloses an automatic original conveying device for conveying a supported original to a reading position and discharging the original from the reading position after the surface to be read of the original is read. More particularly, the specification discloses an automatic original conveying device characterized by a supporting tray for supporting thereon originals in such a page order that the last page is lowermost and with the surfaces to be read of the originals facing upward, supply means for separating and feeding each lowermost one of the originals supported on the supporting tray, first guide means for reversing the original fed by the supply means and directing it to the reading position, original discharging means for discharging the original which has been directed to the reading position by the first guide means and whose surface to be read has been read, from the same side as that side on which the original has entered the reading position, and second guide means for reversing the original discharged from the reading position by the original discharging means and directing it to an original receiving portion.

10 Claims, 11 Drawing Figures

AUTOMATIC ORIGINAL CONVEYING DEVICE

BACKGROUND OF THE INVENTION

1. Field of the Invention

This invention relates to an automatic original conveying device for conveying a supported original to a reading position and discharging the original from the reading position after the surface to be read of the original is read.

2. Description of the Prior Art

Description will hereinafter be made by taking as an example an automatic original conveying device used in a copying apparatus or the like.

An example of the automatic original conveying device according to the prior art is disclosed in U.S. Pat. No. 3,556,512. A model view of such device is shown in FIG. 1A of the accompanying drawings. In this device, originals are supported on a supporting tray with the surfaces to be read of the originals facing downward. (This state is shown at ①.) These supported originals are separated and conveyed one by one to a platen and the surfaces to be read of the originals are exposed to light, whereafter the originals are fed back and returned onto the supporting tray. (This state is shown at ②.)

In this device, however, the originals supported on the supporting tray in the order of pages are fed onto the platen in the order with the lowermost page first and thus, copies are supported in the reverse order of pages. (This state is shown at ③.) Also, the fact that originals are supported on the supporting tray with the surfaces thereof to be read facing downward leads to the inconvenience that it is difficult for the operator to confirm the surfaces to be read. In the Figure, A designates an automatic original conveying device, B denotes a copying apparatus, C designates a cassette and D denotes a copy receiving tray. The uncircled numbers indicate the pages.

Another automatic original conveying device according to the prior art is disclosed in U.S. Pat. No, 4,169,674. A model view of this device is shown in FIG. 1B of the accompanying drawings. In this device, originals are supported on a supporting tray with the surfaces thereof to be read facing upward. (This state is shown at ①.) The supported originals are separated one by one and conveyed to a platen and the surfaces to be read are exposed to light, whereafter the originals are returned onto the supporting tray from the side opposite to that side on which the originals have entered the platen. (This state is shown at ②.) That is, this device is designed such that an original fed from the supporting tray forms substantially such a closed loop that it passes the platen and is returned onto the supporting tray.

In this device, however, a closed loop in which an original is circulated is formed and therefore, the driving system for conveying originals must be decentralized dispersed over the entire device.

In contrast, the present invention provides an automatic original conveying device in which originals can be supported on the supporting tray with the surfaces to be read facing upward and copies can be obtained in the order of pages and the driving system can be arranged compactly. A model view of the device to which the present invention is applied is shown in FIG. 1C of the accompanying drawings.

SUMMARY OF THE INVENTION

It is an object of the present invention to provide an automatic original conveying device in which copies in the order of pages can be obtained if originals are supported with the surfaces to be read facing upward.

It is another object of the present invention to provide an automatic original conveying device in which the driving system can be arranged compactly.

It is still another object of the present invention to provide an automatic original conveying device which can be compactly installed in a recording apparatus such as a copying apparatus, a printer or a facsimile apparatus.

That is, the present invention is an automatic original conveying device for conveying a supported original to a reading position and discharging the original from the reading position after the surface to be read of the original is read, characterized by a supporting tray for supporting thereon originals in such a page order that the last page is lowermost and with the surfaces to be read facing upward, supply means for separating and feeding each lowermost one of the originals supported on the supporting tray, first guide means for reversing the original fed by the supply means and directing it to the reading position, original discharging means for discharging the original which has been directed to the reading position by the first guide means and whose surface to be read has been read, from the same side as that side on which the original has entered the reading position, and second guide means for reversing the original discharged from the reading position by the original discharging means and directing it to an original receiving portion.

Thus, the present invention provides an automatic original conveying device in which originals can be supported on the supporting tray with the surfaces to be read thereof facing upward and copies can be obtained in the order of pages and the driving system can be arranged compactly.

The invention will become more fully apparent from the following detailed description thereof taken in conjunction with the accompanying drawings.

DESCRIPTION OF THE PREFERRED EMBODIMENTS

An embodiment of the present invention will hereinafter be described with reference to the drawings.

FIGS. 2, 3, 4A, 4B, 5 and 6 show an embodiment of the present invention.

Figure 2:
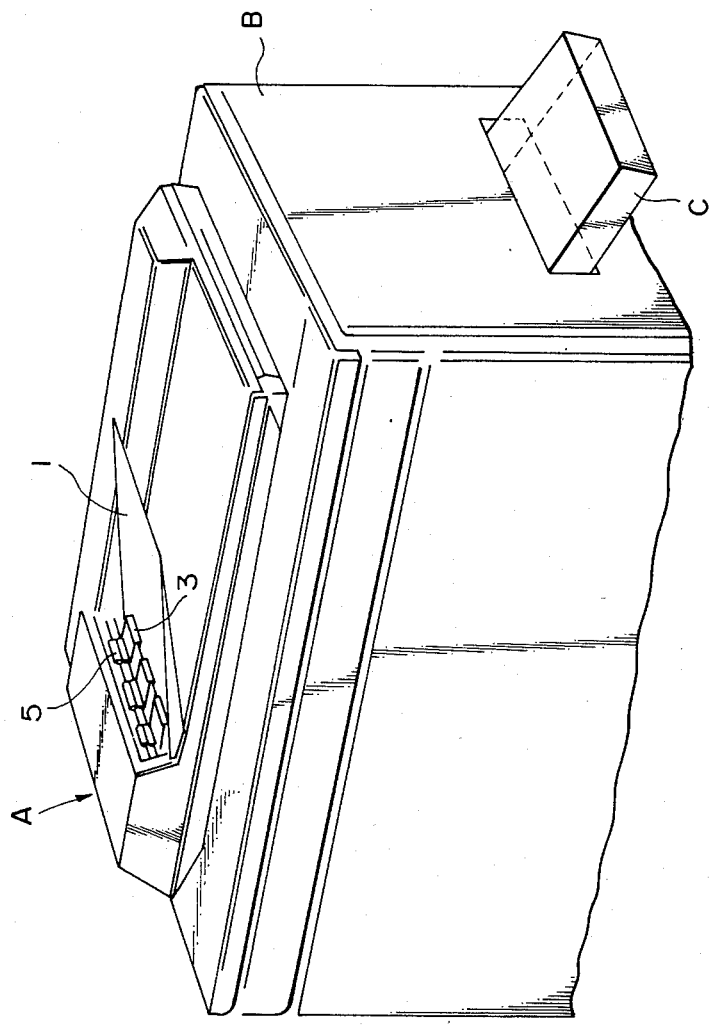
FIG. 2 is a perspective view of a copying apparatus provided with the automatic original conveying device according to an embodiment of the present invention.
Figure 3:
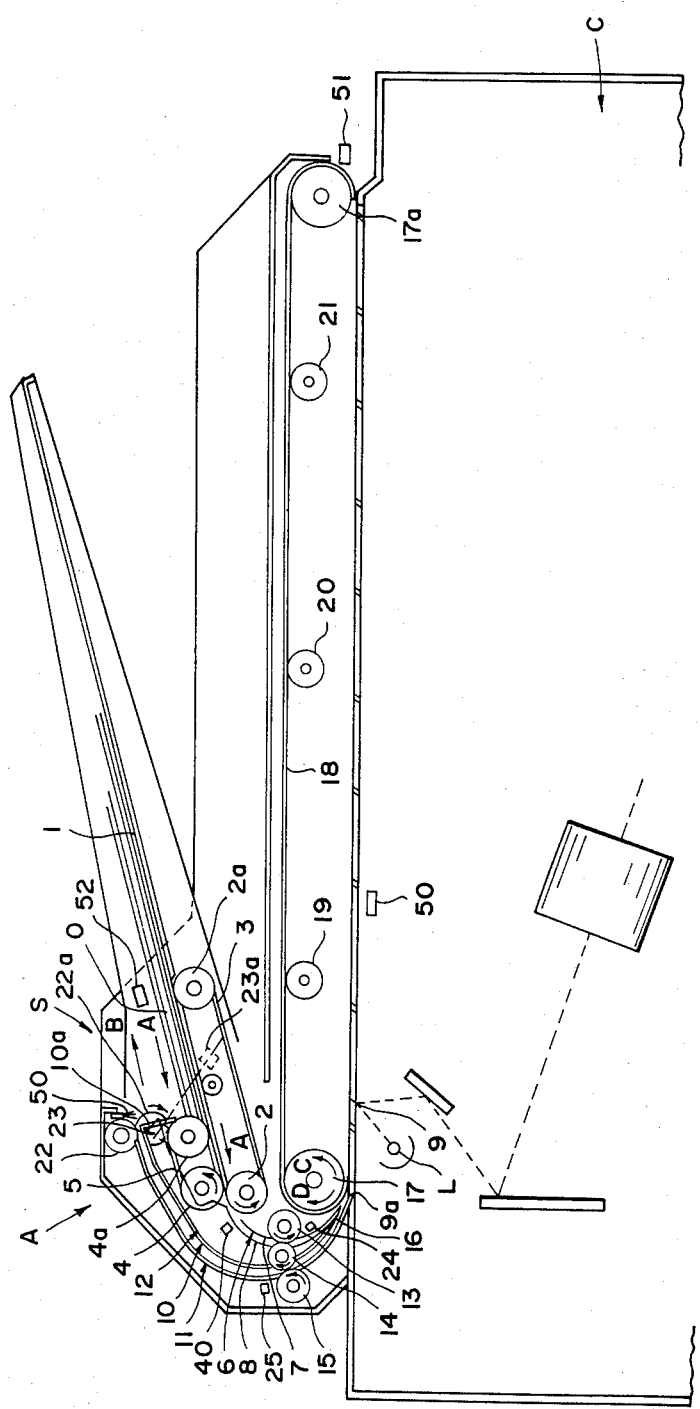
FIG. 3 is a side view of the automatic original conveying device according to an embodiment of the present invention.

FIG. 2 is a perspective view showing the appearance of an automatic original conveying device A to which an embodiment of the present invention is applied, and FIG. 3 is a cross-sectional view thereof. In FIG. 2, the device A is shown as being mounted on a copying apparatus body B. In FIGS. 2 and 3, reference numeral 1 designates a supporting tray on which originals are supported and set. This tray 1 supports thereon originals O in such a page order that the last page is lowermost and in such a condition that the surface to be read of each original faces upward. Further, the tray 1 is downwardly inclined in the direction toward the original feeding side so that the original feeding side is lower. Thus, the originals to be fed are supported uniformly in the feeding direction. Reference numerals 2 and 2a designate feed rollers which may move a feed belt 3 round in the direction of arrow A to feed the originals on the tray 1. Reference numerals 4 and 4a denote separating rollers which may move a separating belt 5 round in the direction of arrow B to thereby separate the lowermost one of the originals supported on the tray 1, between the separating belt 5 and the feed belt 3. The feed belt 3 and the separating belt 5 together constitute a separating-supply portion S. This separating-supply portion S is provided at a level whereat the portion of contact between the belt 3 and the belt 5 is near the lowermost one of the originals supported on the downwardly inclined tray 1. Also, the supply portion S is provided substantially centrally of the originals O. A first sheet pass 6 is formed between guides 7 and 8 and it is a path for moving the originals separated one by one between the feed belt 3 and the separating belt 5 onto an original platen glass 9 as the reading position. The sheet pass 6 is provided in the form of an arch between the separating-supply portion S and the end portion 9a of the platen glass 9, and reverses the original fed by the feed belt 3 and directs it onto the platen glass 9. A second sheet pass 10 is formed between arch-shaped guides 11 and 12 and it is a path for reversing the original after exposed to image light by an illuminating lamp L from the platen glass 9 and directing it to the supporting tray 1. The second sheet pass 10 is provided in opposed relationship with the first sheet pass 6 and leads from the end portion 9a of the platen glass 9 through the outside of the sheet pass 6 (namely, the route spaced apart with respect to a belt 18) to the portion above the separating belt 5. The end portion 10a of the sheet pass 10 which is above the separating belt 5 is provided substantially at the same position as the peripheral surface of the roller 4a, and discharge rollers 22 and 22a are mounted there. Thus, the original discharged from the platen glass 9 is directed by this sheet pass 10 and discharged onto the tray 1 in the opposite direction (direction B) to the direction A in which the supported originals are fed by the feed belt 3 and the separating belt 5. That is, the direction of feeding of the original from the tray 1 and the direction of discharge of the original onto the tray 1 are opposite to each other. Reference numerals 13, 14 and 15 designate sheet transporting rollers. Between the rollers 13 and 14, the original passing through the sheet pass 6 is conveyed toward the platen glass 9, and between the rollers 14 and 15, the original passing through the sheet pass 10 is conveyed toward the supporting tray 1. Reference numeral 16 denotes a flexible deflecting plate attached to the guide 12 so that the tip end thereof is in contact with the guide 7. The leading end edge of the original having passed through the sheet pass 6 can pass pushing the deflecting plate aside. The original travelling from the platen glass 9 toward the sheet pass 10 can be reliably directed to the pass 10 because the tip end of this deflecting plate 16 is pushed by the guide 7. The deflecting plate 16 is formed of a flexible sheet-like material such as Mylar or stainless steel sheet. Designated by 17 and 17a are original conveying rollers which move an original conveying roller 18 provided on the glass 9 substantially over the full width thereof to direct the original onto the platen glass 9 or which convey the original on the glass 9 to remove it therefrom. The roller 17 is designed such that it is rotated in the direction of arrow C when originals are to be conveyed onto the platen glass 9 and set thereon, and is rotated in the direction of arrow D in response to a signal from a sensor 25 when originals are to be removed from the platen glass 9 after completion of the exposure to image light. If the roller 17 is used as a drive roller and the roller 17a is used as a follower roller rotated by the belt 18, these conveying rollers 17 and 17a will satisfy at a time the structural advantage that the drive system can be concentrated and the functional advantage that the original is conveyed on the slack side of the belt 18 whereby the conveyance characteristic accompanying an increased friction force is improved. Designated by 19, 20 and 21 are belt keeping rollers which press the belt 18 against the upper surface of the glass 9 to ensure the conveyance of the original by the belt 18 and also to obtain a sharp image. Denoted by 22 and 22a are discharge rollers for kicking out the original passed through the sheet pass 10 onto the supporting tray 1. Reference numerals 23, 23a, 24 and 25 designate photosensors. The photosensors 23 and 23a detect the presence of an original or originals on the supporting tray 1, and the photosensor 24 detects the passage of an original through the sheet pass 6. The sensor 25 detects the passage of an original through the sheet pass 10.

Figure 4A:
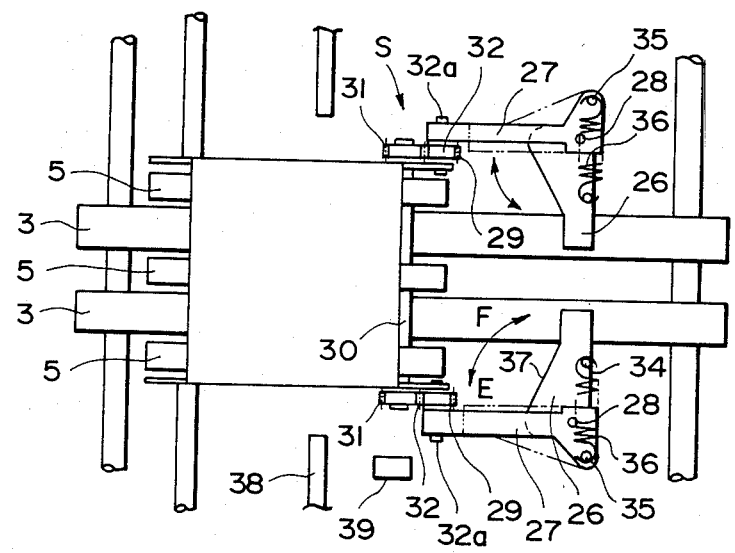
FIG. 4A is a top plan view showing an original separating portion.
Figure 4B:
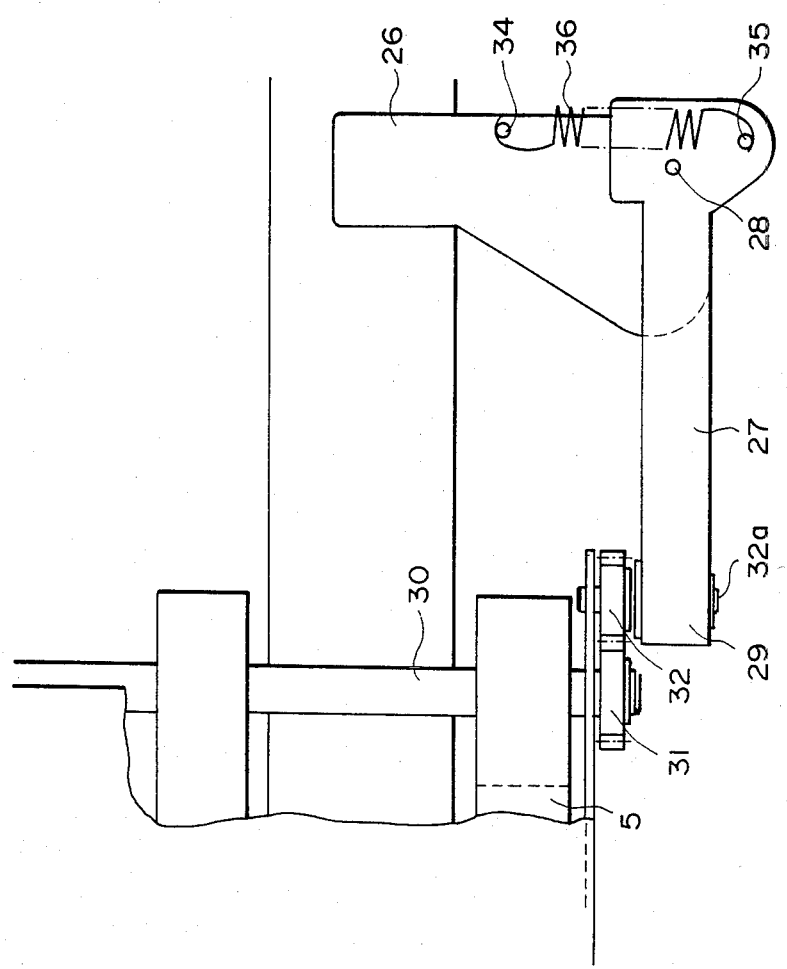
FIG. 4B is a top plan view of a partition plate.

Reference is now had to FIGS. 3, and 4A and 4B to describe an original separating portion to which an embodiment of the present invention is applied.

Figure 5:
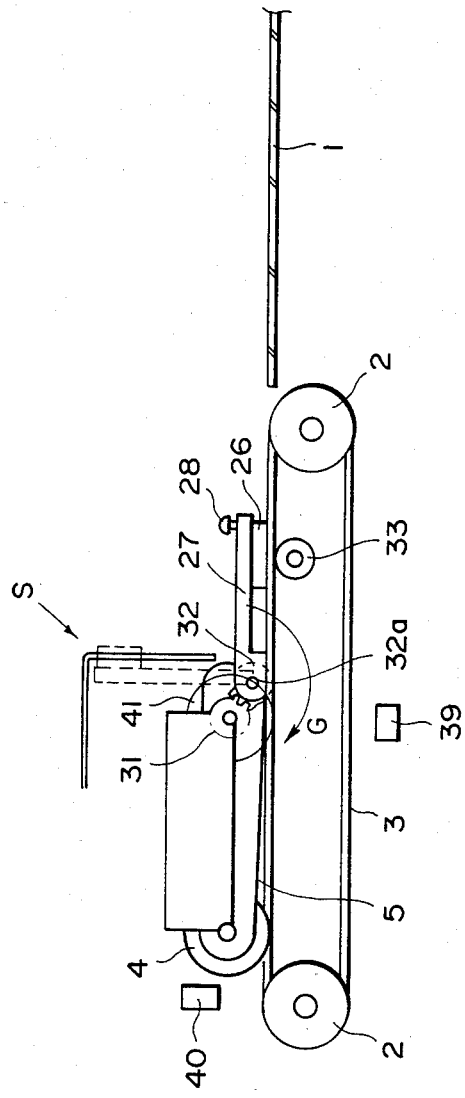
FIG. 5 is a side view of the original separating portion.
Figure 6:
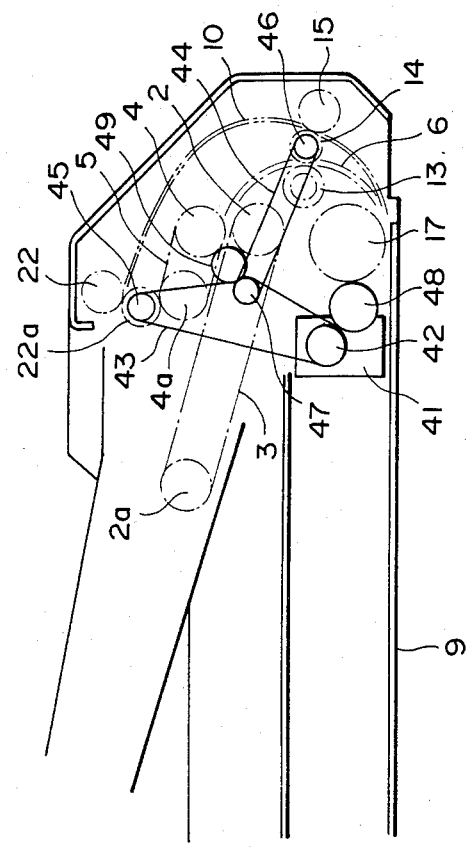
FIG. 6 is a model view of a driving portion.

FIG. 4A is a top plan view showing the original separating portion. FIG. 4B is an enlarged top plan view of a partition plate. FIG. 5 is a side view showing the original separating portion.

In FIGS. 4A, 4B and 5, reference numeral 26 designates partition plates for sorting originals before exposure to light and originals after exposure to light. A set of such partition plates 26 are provided in opposed relationship at the opposite ends of the separating-supply portion S. Each of these partition plates 26 is supported on a partition plate arm 27 by a fulcrum 28. Designated by 29 is a friction plate interleaved between an arm gear 32 engaged with a gear 31 fixed to a separating roller shaft 30 and the partition plate arm 27. By the separating rollers 4 and 4a being rotated, the friction plate 29 applies a load in the direction of arrow G to the partition arm plate 27. The gear 32, arm 27 and friction plate 29 are mounted on a shaft 32a. This expedites the feeding of the original from the supporting tray 1. That is, the partition plates 26 have their tip ends contacting the belt 5 and press against the belt 3 the originals P placed from the belt 3 onto the tray 1, and thus can reliably separate and convey the lowermost one of the supported originals. Further, there is mounted a roller 33 which receives the load of the partition plates 26 through the feed belt 3. By this expedient, the force with which the partition plates 26 press the original against the belt 3 is further increased. Designated by 36 is a spring extended between a shaft 34 on the partition plate 26 and a shaft 35 on the partition plate arm 27. Because of this spring, the line passing through the shafts 34 and 35 crosses the fulcrum 28, whereby the partition plates 26 are moved in the directions of arrows E and F. The outer periphery of each partition plate 26 is cam-shaped, and when the partition plates 26 and the partition plate arms 27 are rotated in the direction of arrow G, the partition plates 26 may be returned in the direction F by shafts 38 mounted at positions whereat they are engaged with the cams 37. Designated by 39 is a photosensor which detects rotation of the partition plate arms 27 in the direction G, whereby it can be judged that one cycle of original copying has been terminated.

Reference is now had to FIG. 5 to describe the driving portion of the automatic original conveying device A.

FIG. 5 is a cross-sectional rear view showing the driving portion. In FIG. 5, reference numeral 41 designates a motor and reference numeral 42 denotes a motor pulley. Belts 43 and 44 for transmitting the drive to the feed rollers 13, 14 and 15 and the discharge rollers 22 and 22a are passed over pulleys 45, 46 and 47. Designated by 48 is a clutch for transmitting the drive from the motor 41 to the conveying roller 17. The clutch 48 is capable of changing over the forward and reverse rotations. Denoted by 49 is a clutch for transmitting the drive from the pulley 47 to the feed roller 2 and separating roller 4. Of the rollers 13, 14 and 15, the roller 14 rotates drivingly and the rollers 13 and 15 follow the rotation of the roller 14. However, this is not restrictive, but for example, the roller 13 may rotate drivingly and the other rollers may follow the rotation of the roller 13.

As described above, in the present embodiment, the driving portion can be concentrated at one location without being decentralized.

Operation will now be described.

A plurality of originals O positioned with their loading end edges in contact with the belt 5 and supported and set on the belt 3 to the tray 1 are separated and fed one by one into the sheet pass 6 by the feed rollers 2, 2a and the separating rollers 4, 4a being rotated in opposite directions by a signal produced upon depression of the copy start button (not shown) of the apparatus body.

The present device is designed such that the feeding speed of the transporting rollers 13, 14 is twice the feeding speed of the feed rollers 2, 2a and therefore, a clearance is always formed between the trailing end edge of an original fed after separation and the leading end edge of the next original. As soon as the sensor 40 provided along the sheet pass 6 detects this clearance, rotation of the feed rollers 2, 2a and separating rollers 3, 3a is stopped. Since the leading end edge of the original thus fed is already nipped between the transporting rollers 13 and 14, the original is transported by the transporting rollers 13 and 14. From the moment when the trailing end edge of the original is detected by the sensor 24 provided downstream of the sheet pass 6, a timer circuit begins to operate and, after the lapse of a predetermined time, namely, after the lapse of the time until the original is conveyed to the original standard position on the platen 9, the roller 17 is stopped from rotating and the original is set at a predetermined position on the platen glass 9 and stopped thereat. The exposure operation by a lamp L1 on the copying apparatus body side is then started. That is, the surface to be read of the original is read. When an exposure completion signal comes from the apparatus body, the conveying roller 17 starts its reverse rotation in the direction D and the original is discharged from the platen glass 9 into the sheet pass 10 by the belt 18. That is, the original is discharged from the platen glass 9 on the same side as that side on which it has entered the platen glass 9. As soon as the leading end edge of the original passing through the sheet pass 10 is detected by the sensor 25 provided downstream of the rollers 14, 15, the feed roller 2 and separating roller 4 start rotating by the signal from the sensor 25 and the next original is fed. Simultaneously therewith, the conveying roller 17 changes its direction of rotation to the direction C, but the original is reliably discharged because the conveying force of the rollers 14, 15 is greater than the conveying force of the belt 18. The original having passed through the sheet pass 10 is kicked out by the rollers 22 and 22a from the same direction as the direction in which the original has been fed from the separating-supply portion S, and is laid onto the partition plates 26 on the supporting tray 1. The supporting tray 1 is inclined so that the original lowers toward the separating portion at this time and thus, the original, after being kicked out by the rollers 22 and 22a, becomes uniformly arranged with its leading end edge striking against the separating roller 3a.

Designated by 50 is a discharging needle which serves to remove the static electricity of the original having passed through the sheet pass 10 and permit the original to be smoothly laid onto the supporting tray 1. Thereafter, the above-described operation is repeated.

As previously described, the original to be discharged is discharged by the conveying force of the rollers 14 and 15. Also, the next original is conveyed onto the platen glass 9 by the conveying forces of the rollers 13, 14 and conveying belt 18. In this case, even if the leading end edge of the discharged original is detected by the sensor 25 and the next original arrives at the platen glass 9 with the aid of the rotation of the belts 3 and 5, where the size of the original is large, the trailing end edge of the discharged original may still remain on the platen glass 9. In the present embodiment, however, the belt 18 is formed of a material of great friction coefficient such as urethane rubber and therefore, the friction force between this belt 18 and the original passing onto the platen glass 9 becomes greater than the friction force between the originals, and the original discharged from the platen glass 9 and the original passing onto the platen glass 9 are conveyed in predetermined directions, respectively, while sliding past each other. By this, the interval at which the originals are fed from the separating-supply portion S can be shortened.

Description will now be made of a case where the last page of plural originals is to be fed. The partition plates 26 exist just above the last page. When the last page is fed, the partition plates 26 come into contact with the feed belt 3 and therefore, the friction force therebetween causes the partition plates 26 to be rotated in the direction of arrow E and the partition plates assume their position indicated by dots-and-dash line with the aid of the force of the spring 36. A load is applied to the partition plate arm 27 in the direction of arrow G by the friction plate 29 and therefore, when the partition plates 26 are folded, the partition plate arm begins to rotate in the direction G. When the trailing end edge of the original is detected by the sensor 40 provided downstream of the sheet pass 6, the feed roller 2 and separating roller 4 stop rotating and thus, when the last page is fed, the partition plate arm 27 is stopped at a position indicated by broken line after having been rotated. When the feeding of the last page is detected, that is, when the partition plate arm 27 is detected by the sensor 39, the last page returns to the supporting tray 1 after the exposure thereof to light, and if the feed roller 2 and separating roller 3 are stopped until a first cycle is completely terminated so that they start rotating for the first original in a second cycle, the partition plates 26 come to ride on the last page.

Figure 7:
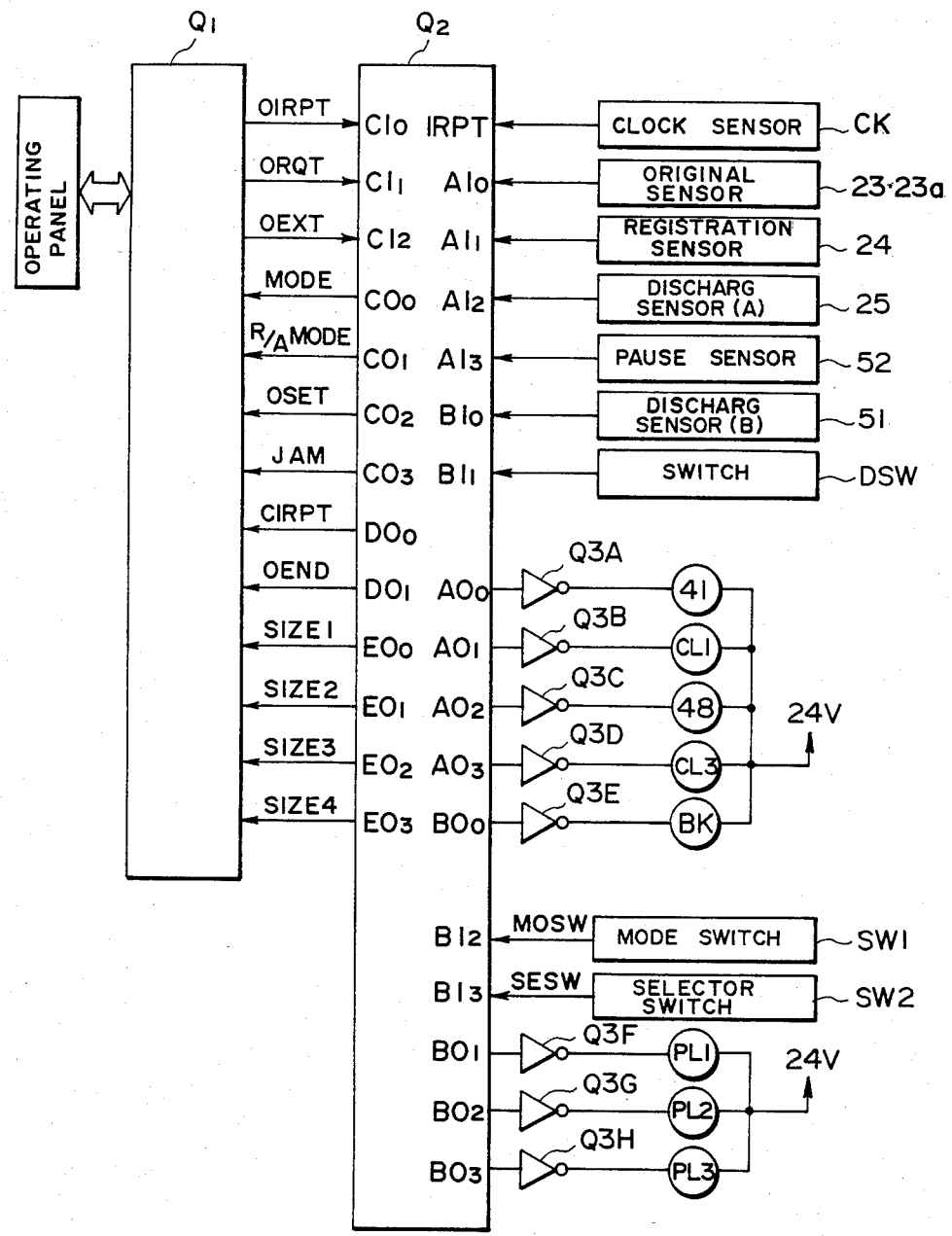
FIG. 7 is a block diagram of an electric circuit for controlling the operation of the automatic original conveying device.

FIG. 7 shows a block diagram of an electric circuit for controlling the operation of the automatic original conveying device A according to the present embodiment.

Q1 designates the control unit of the copying apparatus body, including a well-known microcomputer. Q2 denotes a control unit comprising a microcomputer for controlling the automatic original conveying device. The control unit Q2 is a well-known LSI including ROM, RAM, ALU, I/O latch, etc. Designated by IRPT is the interruption terminal of the microcomputer Q2. $AI_0$, $AI_1$, $AI_2$, $AI_3$, $BI_0$, $BI_1$, $BI_2$, $BI_3$, $CI_0$, $CI_1$ and $CI_2$ denote input ports. $AO_0$, $AO_1$, $AO_2$, $AO_3$, $BO_0$, $BO_1$, $BO_2$, $BO_3$, $CO_0$, $CO_1$, $CO_2$, $CO_3$, $DO_0$, $DO_1$, $EO_0$, $EO_1$, $EO_2$ and $EO_3$ designate output ports.

The control unit Q2 puts out a control signal to the output ports in accordance with the input signal to the input ports and effects control of the operations of various portions.

CK designates a clock pulse detecting sensor for detecting the slit of a clock plate effecting rotation synchronized with the aforedescribed conveying roller 17. The clock pulse detecting sensor CK may be, for example, a photointerrupter comprising an LED and a phototransistor.

Designated by 50 is a platen sensor for detecting the original on the platen glass 9, and denoted by 51 is a second discharge sensor for detecting the rightward discharge of the original from the platen glass 9. Designated by 52 is a pause sensor for detecting the position of the partition plates 26 placed on top of a set of originals. The pause sensor 52 comprises a Hall IC which detects a magnet attached to the partition plates 26. Denoted by DSW is an opening-closing switch for detecting the opened or closed state of the upper lid of the separating-supply portion S.

Q3A, Q3B, . . . , Q3H designate transistor arrays comprising transistors or the like.

Designated by 41 is a DC motor for driving the rollers of the present device. CL1 denotes an electrical clutch for transmitting the rotational force of the motor 41 to drive the rollers 2 and 4 in the direction of arrow.

CL2 designates an electrical clutch of the aforementioned clutch 48 for transmitting the rotational force of the motor 41 to drive the roller 17. When electric power is supplied to the clutch CL2, the roller 17 is rotated in a direction C.

CL3 denotes an electrical clutch of the clutch 48 for rotating the roller 17 in the opposite direction. When electric power is supplied to the clutch CL3, the roller 17 is rotated in a direction D. The roller 13 is rotated in the direction of arrow when electric power is supplied to the clutches CL2 and CL3.

BK denotes an electrical brake for stopping the roller 17 accurately.

SW1 designates a mode switch (not shown) operated by the user when the present device is used. SW2 denotes a selector switch (not shown) for selecting the change-over of ADF or RDF.

The RDF mode is a mode in which the copying operation is effected once for each of originals fed in succession and the feeding operation is repeated for a designated number of copies, and the ADF mode is a mode in which the copying operation for a designated number of copies is continuously effected for an original fed and continuous copying operation is again effected with the feeding of the next original effected upon termination of the first-mentioned continuous copying operation and thus, the feeding operation is repeatedly effected for the number of originals supported on the supporting tray.

PL1 designates a display device adapted to be turned on during the ADF mode. PL2 denotes a display device adapted to be turned on during the RDF mode. PL3 designates a display device adapted to be turned on when jam of an original occurs.

The input ports $CI_0$, $CI_1$, and $CI_2$ receive as input the signal from the control unit Q1 of the copying apparatus body, and the output ports $CO_0$, $CO_1$, $CO_2$, $CO_3$, $DO_0$, $DO_1$, $EO_0$, $EO_1$, $EO_2$ and $EO_3$ put out control signals to the control unit Q1.

In the embodiment described above, an example has been shown in which the originals after being copied return to the supporting tray, whereas the present invention is not restricted thereto but, for example, the originals after copied may be discharged onto a tray discrete from the supporting tray. That is, the supporting tray and the original receiving portion may be integral with each other or discrete from each other. Also, the supporting tray and the original receiving portion may be partitioned from each other by a partition plate. Further, if each sheet pass is made operable, jam treatment will become easier.

Further, the supply means for separating and feeding the originals on the supporting tray one by one is not restricted to the belts moved round in opposite directions, but may also be conventional means such as, for example, a roller and a roller or a roller and a separating piece urged against the roller.

The original discharging means is not restricted to a belt of full width, but may also be conventional means such as, for example, divided belts or rollers or a combination of rollers and a belt. The supporting tray need not always be inclined toward the original feeding side, but may also be parallel, for example.

The present invention can also be widely utilized in other apparatuses than a copying apparatus and, where it is applied, for example, to a facsimile apparatus, the reading position is not on the platen glass but the recording-reading portion. That is, the reading position or the reading operation is not restricted to the platen glass or the exposure operation, but may be suitably changed.

Another embodiment of the present invention will now be shown.

Figure 1A:
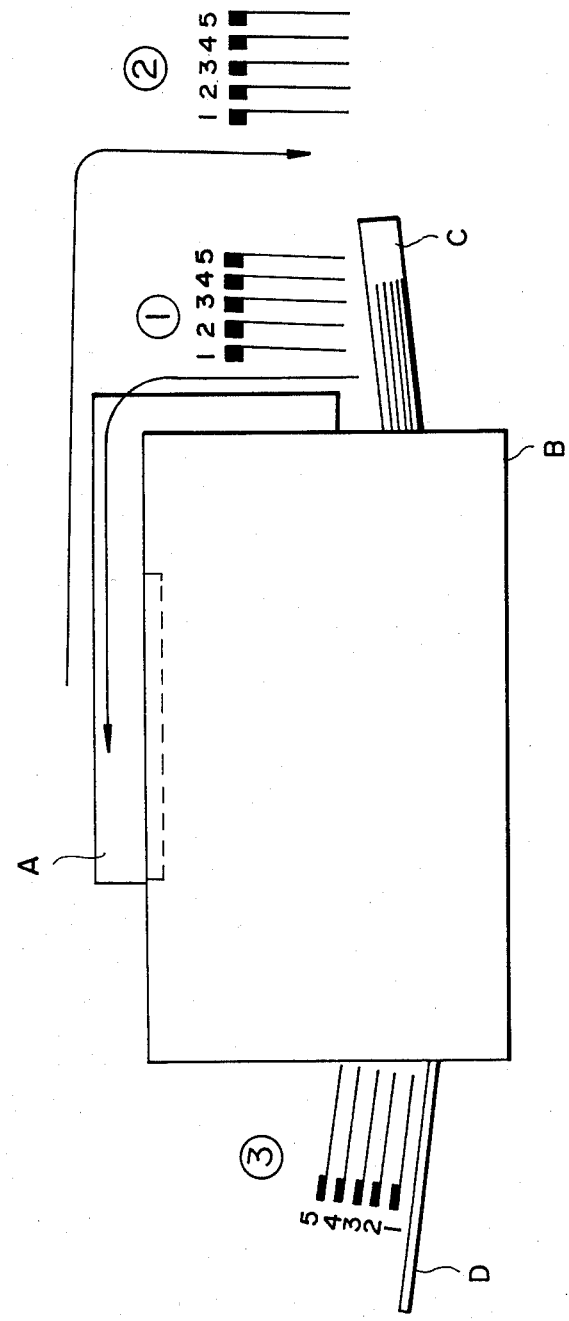
FIGS 1A and 1B are model views of the devices according to the prior art.
Figure 1B:
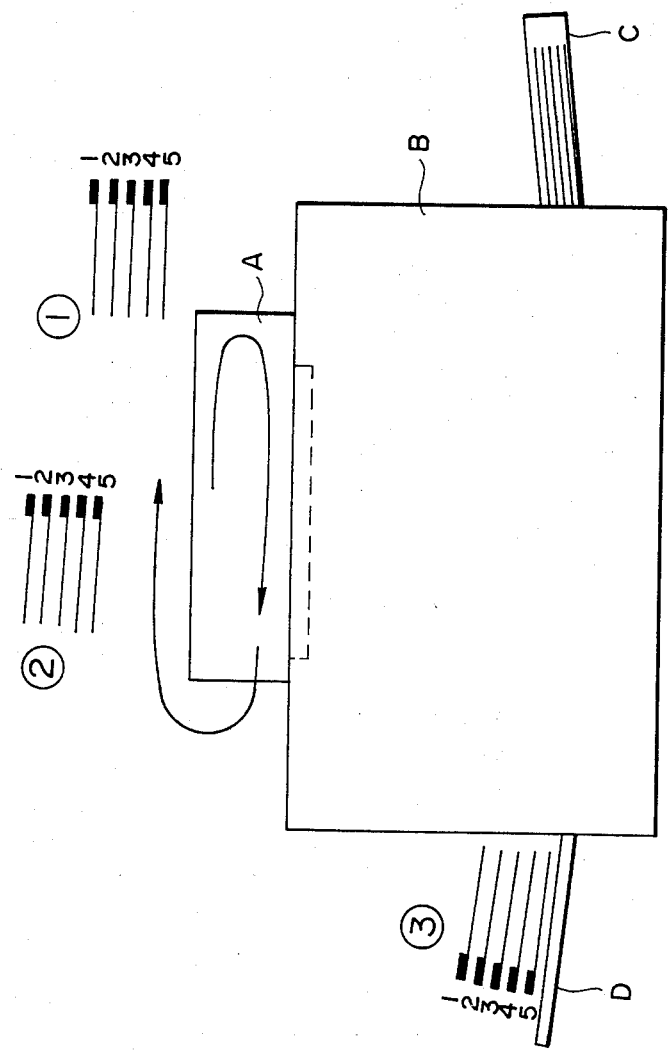
Figure 1C:
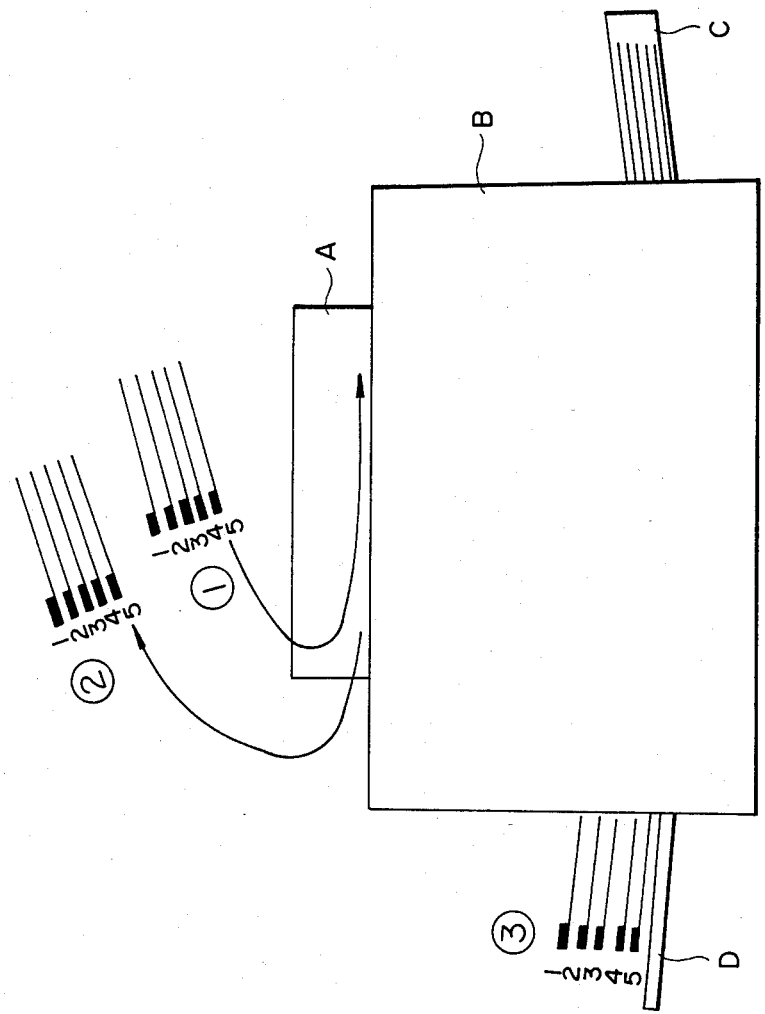
FIG. 1C is a model view of an embodiment of the present invention.
Figure 8:
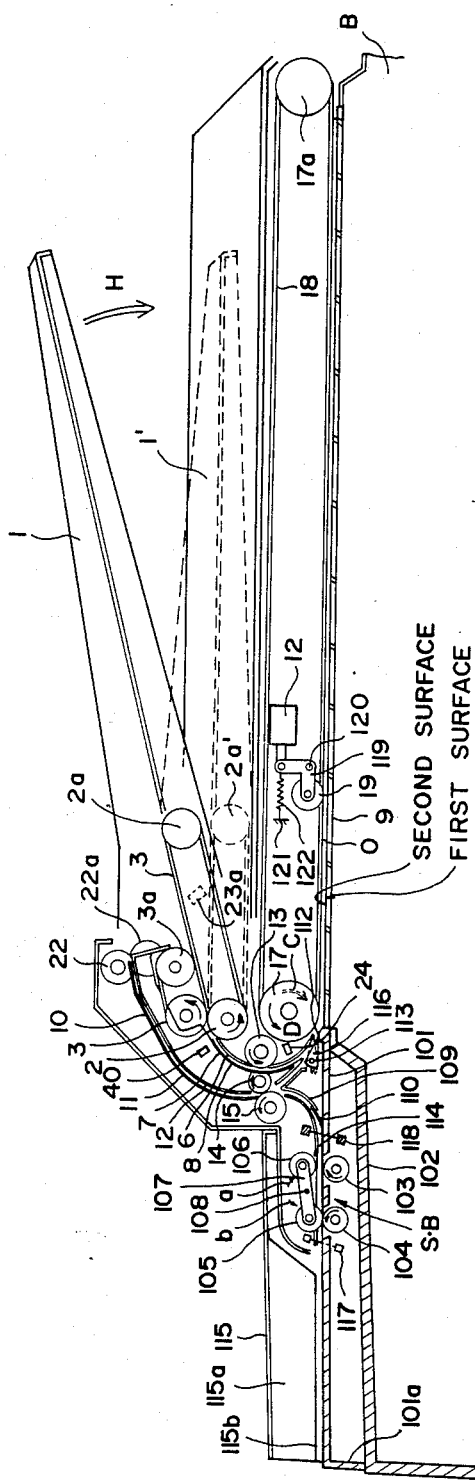
FIG. 8 is a cross-sectional view of another embodiment of the present invention.

FIG. 8 is a cross-sectional view of an automatic original both-side conveying device (B-R-ADF) in which the automatic original conveying device (R-ADF) of FIG. 1 is additionally endowed with the original both-side copying function.

The members designated by newly added reference numerals 101 et seq. differ from those shown in the previously described embodiment, and the other members and the functions thereof are as previously described. A paper path changing-over member 116 is rotatable about a shaft 113 and, when a both-side copy button (not shown) is depressed and a both-side copy signal is received, the paper path changing-over member is changed over from its solid-line position to its broken-line position by other power (for example, a solenoid or the like). A sheet material 112 is secured to the changing-over member 116 on the original path side thereof and design is made such that the changing-over member 116 is urged against the surface of the platen 9 or the belt 18 with the aid of the bending elasticity of the sheet material. The changing-over member 116 is changed over to its broken-line position before the roller 17 starts rotating, that is, immediately after termination of the copying of a first surface. Thereby, the sheet pass 10 is closed and a retraction pass 114 is opened. The solid-line position of the changing-over member 116 is a position in which the device functions only as the aforesaid ADF, DF, R-ADF.

The original O present on the platen 9 whose first surface has already been copied is conveyed leftwardly as viewed in FIG. 8 by its friction with the belt 18 due to the roller 17 being rotated in the direction of arrow C. The original O then passes below the member 116 and into a sheet pass 114 on the extension of the platen glass 9 while pushing a flexible guide 110 aside. Forwardly of the sheet pass 114, there is switch-back means S·B comprising rollers 103, 104, 105 and 106. The forwardly feeding roller 104 and the reversely rotating roller 103 are rotated in the directions of arrow, respectively. The follower urging rollers 105 and 106 are supported by a rocking plate 107 and rockable about a shaft 108. The rocking plate can be rocked in the direction of arrow a from the shown urged position of the forwardly feeding roller 104 and the roller 105 by other power (for example, a solenoid or the like) and changed over by an electrical signal or the like toward the side on which the roller 106 is urged against the reversely rotating roller 103. During the retraction of the original O, the rocking plate 107 is rocked in the direction of arrow b and the original O is retracted from the glass 9 along the pass 114 by the conveying force of the rollers 104 and 105.

Now, the belt 18 continues to move round in the direction of arrow C until the leading end edge of the original O passes between the forwardly feeding roller 104 and the roller 105 to a sensor 117. When the sensor 117 detects the leading end edge of the original, the rotation of the roller 17 is changed to the direction of arrow D by the detection signal of the sensor 117 and the device becomes ready to receive the next both-side original which is fed from the lowermost position of the originals supported on the tray 1. When the trailing end edge of the original O enters the pass 114 and is detected upstream of the switch-back means S·B by a sensor 118 provided downstream of the guide 110, the rocking plate 107 is rocked rightwardly (in the direction of arrow b) by the detection signal of the sensor 118 (by the action of a solenoid or the like), and the roller 106 is urged against the reversely rotating roller 103 and at the same time, the conveying force of the forwardly feeding roller 104 is released and thus, the original O begins to be moved backwardly and is directed toward the pass 10 by the guide 110 and discharged onto the tray 1 through the pass 10, and is placed thereon with a second surface of the original O facing upward. Accordingly, when copying of other original underlying the original O is terminated and this original O is then fed, the second surface thereof becomes the surface to be exposed and copied as previously described in connection with the previous embodiment. Thus, according to the present embodiment, both sides of the both-side original can be automatically copied.

A rib portion 115a as a guide suited for paper guide is provided on the cover 115 of a reversing pass. Also, an opening 115b for a long-footage original is provided in the cover 115, so that the leading end portion of the long-footage original hangs down from the opening 115b until the trailing end edge thereof is detected by the sensor 118. The upper surface of the cover 115 is approximately horizontal and may also be used for other purpose such as an original supporting table.

Further, the construction of the switch-back means 104, 103, 105, 106 sufficiently functions even if it is as shown, but is has been confirmed by an experiment that if the forwardly and reversely rotating rollers 104 and 103 are disposed in overlying relationship with the rocking rollers, a better paper conveyance effect is obtained.

Further, in the present embodiment, the tray 1 can be rotated about the roller 2 so as to collapse into the position indicated by broken lines 1'. At the same time, the roller 2a rotated through the belt 3 also assumes its position 2a. In this collapsed state, the device does not function as B-R-ADF (automatic both-side original circulating device) or R-ADF (automatic original circulating device) or ADF (automatic original conveying device) which handles a number of originals, but can function only as DF which handles a manually supplied original.

Further, the urging roller 19 normally presses the surface of the belt 18 about a central shaft 120 by a spring 122 through the intermediary of an arm 119, but during replacement of originals, it is separated from the belt 18 by the action of a solenoid. This is a contrivance for not impeding the conveyance of an original fed onto the platen 9 and an original discharged leftwardly from the platen 9, because during the replacement of originals in the B-R-ADF or R-ADF mode, said originals may temporally contact each other and pass by each other.

As described above, the present embodiment provides a multifunctional automatic both-side original circulating and conveying device which is compact, light in weight and inexpensive and has high reliability, and the device according to the present embodiment is not only applicable to all of common copying apparatuses, but also if it is used in combination with a both-side copying apparatus, it will be more effective. Also, if copying is effected by the use of the R-ADF according to the present embodiment, a set of copies in a good page order can be obtained each time the originals have run their course and therefore, if the device of the present embodiment is used in association with a copying apparatus having a conventional swivelling paper discharge tray, a large sorter or the like for page arrangement will become unnecessary and, from such a point of view, it will be seen that the device of the present embodiment is also suitable particularly for versatile, compact copying apparatuses.

The above-described construction of the present invention permits originals of different sizes to be used, and the fact that the central functional portions are concentrated at a single location leads to compactness and light weight of the device.

Also, the device of the present invention is a device which enables development or extension to R-ADF or B-R-ADF with the construction of ADF as the basis and can readily cope with a very wide range of requirement.

What we claim is:

1. An automatic original conveying device for conveying an original to a reading position and thereafter retracting the original from the reading position, comprising:

means for supporting originals;

feeding means for separating and feeding a lowermost one of the orignals supported on said supporting means;

first guide means for leading the original fed by the feeding means to the reading position in a reversed state to that of the originals located on the supporting means;

original retracting means for retracting the original led to the reading position from the same side as that at which the original has been led to the reading position; and second guide means for returning the original to the supporting means from the same side as that from which the original has been fed, in a reversed state to that of said original retracted from the reading position.

2. An automatic original, conveying device according to claim 1, wherein said first guide means has an arch-shaped path.

3. An automatic original conveying device according to claim 1, wherein said original discharging means has an endless belt movable around in forward and reverse directions.

4. An automatic original conveying device according to claim 1, wherein said second guide means has an arch-shaped path.

5. An automatic original conveying device according to claim 1, wherein said reading position is on a platen glass.

6. An automatic original conveying device for conveying an original to a reading position and thereafter retracting the original from the reading position, comprising:

means for supporting originals;

feeding means for separating and feeding a lowermost one of the originals supported on said supporting means;

first guide means for leading the original fed by the feeding means to the reading position in a reversed state to that of the originals located on the supporting means;

original conveying means for retracting the original led to the reading position from the same side as that at which the original has been led to the reading position, and conveying the retracted original along a path spaced from that by which the original has been led to the reading position while a subsequent original is being led to the reading position; and means for returning the original to the supporting means in a reversed state to that of said original conveyed by said original conveying means.

7. An automatic original conveying device for conveying an original to a reading position and thereafter retracting the original from the reading position, comprising:

means for supporting originals;

feeding means for separating and feeding a lowermost one of the originals supported on said supporting means;

first guide means for leading the original fed by the supply means to the reading position in a reversed state to that of the originals located on the supporting means;

original retracting means for retracting said original led to the reading position from the same side as that at which said original has been led to the reading position; and second guide means for returning the original retracted from the reading position to the supporting means in a reversed state to that of said original retracted from the reading position;

third guide means for returning the original to the supporting means in non-reversed state to that of said original retracted from the reading position; and path change-over means for selectively guiding said original retracted from the reading position to the second and third guide means.

8. An automatic original conveying device according to claims 1, 6, or 7, wherein said supporting tray is inclined toward the original feeding side.

9. An automatic original conveying device according to claims 1, 6, or 7, wherein said feeding means has an endless belt passed over rollers.

10. An automatic original conveying device according to claims 1, 6, or 7, wherein said feeding means has two endless belts moved around in opposite directions.

* * * * *